United States Patent [19]

Lindenau et al.

[11] Patent Number: 5,777,233

[45] Date of Patent: Jul. 7, 1998

[54] GAS-FRICTION VACUUM INDICATOR WITH A GAS-FRICTION SENSOR ROTATING ABOUT A FIXED AXIS OF ROTATION

[75] Inventors: Bernd Lindenau, Jülich; Johan K. Fremerey, Bonn; Klaus Witthauer, Aachen, all of Germany

[73] Assignees: Forschungszentrum Julich GmbH, Julich; RWD-Datentechnik GmbH, Aachen, both of Germany

[21] Appl. No.: 663,090

[22] PCT Filed: Dec. 14, 1994

[86] PCT No.: PCT/DE94/01482

§ 371 Date: Jun. 19, 1996

§ 102(e) Date: Jun. 19, 1996

[87] PCT Pub. No.: WO95/17654

PCT Pub. Date: Jun. 29, 1995

[30] Foreign Application Priority Data

Dec. 21, 1993 [DE] Germany .................. 43 43 575.0

[51] Int. Cl.$^6$ ..................................... G01L 9/00
[52] U.S. Cl. ............................................ 73/753
[58] Field of Search ................................. 73/753

[56] References Cited

U.S. PATENT DOCUMENTS 4,395,914  8/1983  Fremerey et al. ................. 73/700
4,619,144  10/1986 Fremerey et al. ................. 73/708

FOREIGN PATENT DOCUMENTS 0 176 735 A2  8/1985  European Pat. Off. .

OTHER PUBLICATIONS

Hirata et al.; Effect of Measuring Conditions on the Accuracy of a Spinning Rotor Gauge; Journal of Vacuum Science and Technology; pp. 1724–1727, 1986.

Primary Examiner—Richard Chilcot
Assistant Examiner—Joseph L. Felber
Attorney, Agent, or Firm—Herbert Dubno

[57] ABSTRACT

A gas-friction vacuum meter has, in addition to the magnetic system for contactlessly suspending the gas sensor, a device for measuring the actual inclination of the rotation axis of that sensor and corrects the measured value for the inclination by comparison of the output signal of this device with an Eddy-current conditioned braking value obtained for a certain inclination angle of the rotation axis.

6 Claims, 2 Drawing Sheets

GAS-FRICTION VACUUM INDICATOR WITH A GAS-FRICTION SENSOR ROTATING ABOUT A FIXED AXIS OF ROTATION

CROSS REFERENCE TO RELATED APPLICATIONS

This application is a national stage application of PCT/DE94/01482 filed 14 Dec. 1994 and based upon German National Application P 43 43 575.0 of 21 Dec. 1993 under the International Convention.

1. Field of the Invention

The invention relates to a gas-friction vacuum meter or indicator with a gas-friction sensor rotating about a fixed axis of rotation. The gas-friction sensor is supported contactlessly and magnetically for rotation within an evacuatable measurement chamber. The magnetic field that is required for this is formed rotationally symmetrical with respect to the rotation axis of the gas-friction sensor and is controllable. The measurement chamber is spatially connected for the pressure measurement with the vacuum chamber whose vacuum is to be measured.

2. Background of the Invention

Gas-friction vacuum meters with magnetically supported rotatable gas-friction sensors are known, see for example German patent 33 34 750 C2. For a vacuum measurement in this pressure measuring device, the braking of the sensor rotation caused by the impingement of molecules on the gas-friction sensor is determined. The braking per unit time is lower to the degree that the pressure is lower, i.e. to the extent that measured vacuum is better. In German patent 34 31 517, a gas-friction vacuum meter is described whose pressure measurement value is temperature correlated, to correct, at a vacuum measurement above a pressure of 0.1 mbar, the gas friction which is influenced by the viscosity. The construction of this gas-friction vacuum meter has required heretofore that the measurement chamber axis, which corresponds to the rotation axis of the gas-friction sensor, be vertically aligned as exactly as possible exactly if inaccuracies in the indication of the measured vacuum were to be avoided.

OBJECT OF THE INVENTION

The object of the invention is, without increased structural cost, to permit a measurement chamber axis to deviate from the horizontal and to compensate for the measurement errors resulting therefrom.

SUMMARY OF THE INVENTION

This object is attained according to the invention in a gas-friction vacuum meter which comprises a gas-friction sensor rotating about a fixed axis of rotation within an evacuatable measuring chamber connected with the evacuated space, whose vacuum is to be measured. The sensor is supported contactlessly, so as to be rotatably by means of a magnetic field which is rotationably symmetrical with reference to the rotation axis. According to the invention the rotation axis deviates from the vertical and preferably has a horizontal orientation. A measuring device is provided for measuring the inclination of the rotation axis with respect to the vertical and has an output signal which serves for the correction of the indicated pressure value, whereby the correction value is determined depending on at least one previously tested eddy-current-conditioned braking value of the gas-friction sensor for a certain inclination angle.

With the aid of the inclination measuring device the true orientation of the rotation axis, with respect to the vertical, is determined and the output signal of the measuring device is fed to a computer unit for correction of false measured values, which are based upon the given position of the axis. The computer displays the pressure measurement which corresponds to the rotation braking of the gas-friction sensor as a result of the instantaneously effective vacuum. The correction magnitude given by the computer unit is based upon the proportionality between the square of the sine of the angle between the vertical and the given orientation of the rotation axis on the one hand and on the other hand, the eddy-current-conditioned braking, determined by the rotation axis, of the gas-friction sensor, the eddy-current braking being additional to the braking as a consequence of the pressure-dependent molecular friction in the vacuum chamber. One can obtain for a known angle the eddy-current induced braking experimentally at high vacuum and negligible friction.

For many applications it is sufficient as a simplification to use a measuring device that determines at least two angles of inclination, especially the horizontal and vertical deviations of the rotation axis. Suitable measuring devices are electronic or electromechanical water balances or spirit levels whose signals are transmitted to the computer unit.

A further advantageous configuration of the invention is found in the use for the gas-friction sensor of previously provided drive or stabilization (or damping or sensor) coils for detecting the given inclination of the rotation axis of the gas-friction sensor. A tilting of the measurement chamber axis causes, based upon gravity, a deflection of the gas-friction sensor out of the symmetry axis of the coil arrangement. The distance of the sensor to the coils is altered, for example, for the drive coils oriented in pairs with respect to the symmetry axis. The differential variations in the coil inductivities thus established are a measure of the given angle between the vertical and the rotation axis and can be used as a measurement parameter for the braking of the gas-friction sensor caused by the eddy-current at an inclined position.

The deviation of the gas-friction sensor due to gravity from the symmetry axis of the magnet and coil arrangement of the gas-friction vacuum meter is noticeable also in the electrical control circuit for the electromagnet stabilization of the gas-friction sensor. In the tilting of the rotation axis to the vertical, in dependence upon the angle, the components of the gravitational force which act upon the gas friction sensor are reduced along the symmetry axis. Thus the zero point of the stabilization electronics is detuned (i.e. there is a shift in the working point). The magnitude of this detuning generates in the control electronics a voltage proportional to the sine of the angle of tilt, which can be provided in a correction signal to the computer unit. The correction of the value indicated by the braking of the gas-friction sensor as a result of the turbulent-dependent braking only corresponds to the calculated values as already given above.

Instead of only registering the deviation of the gas-friction sensor from the symmetry axis and the generation of corresponding correction signals, in many cases it is necessary to maintain a given coaxial position of the gas-friction sensor, especially to avoid contact of the gas-friction sensor with the wall of the measurement chamber. This is achieved in an advantageous manner with the aid of drive coils whose axes coincide with the measurement chamber axis. With an arrangement of the drive coils as coil pairs, the drive coils can then be so switched that a deviation of the gas-friction sensor from its mean position in the measuring chamber is

3 detected and via a control circuit as is also used for the electromagnetic position stabilization of the gas-friction sensor, a restoring force can act upon the gas-friction sensor. The information as to the inclined position of the rotation axis, which is necessary for the measurement correction of the gas-friction sensor, can be determined then from the electrical power applied for repositioning the gas-friction sensor.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
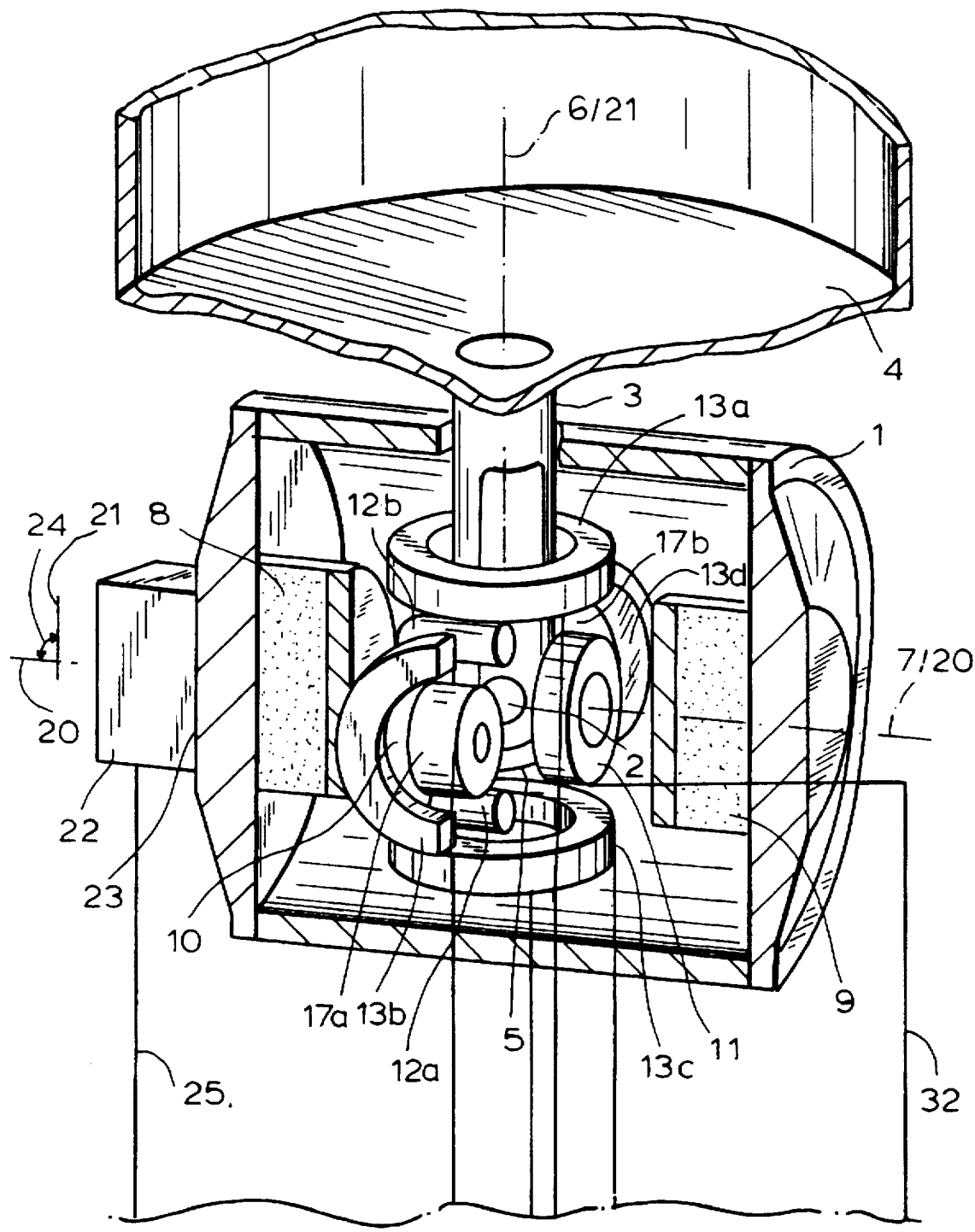
FIG. 1 a perspective section of a measuring head of a gas-friction vacuum meter with a ball-shaped gas-friction sensor.

The drawing shows a measuring head 1 with a ball-shaped gas-friction sensor 2 in a thin-wall metal tube 3 which is fastened vacuum tight to a vacuum chamber 4 whose vacuum is to be measured and which is open at its end to the vacuum chamber 4. The opposite end of the metal tube 3 is closed vacuum tight by a cover 5. The measuring head 1 with its symmetry axis 7 running perpendicular to the tube axis 6 of the metal pipe 3 is slidable onto the metal pipe 3.

The contactless position of the gas-friction sensor 2 fabricated from magnetizable material, is established by two permanent magnets 8 and 9 and two controllable electrical stabilizing coils 10, 11 which are arranged pair-wise opposite one another with reference to the symmetry axis 7.

Four further electrical damping coils 12 are also arranged pair-wise around the gas-friction sensor 2 (in FIG. 1 only the damping coils 12a, 12b are visible) for the damping of lateral oscillations of the gas-friction sensor.

Figure 2:
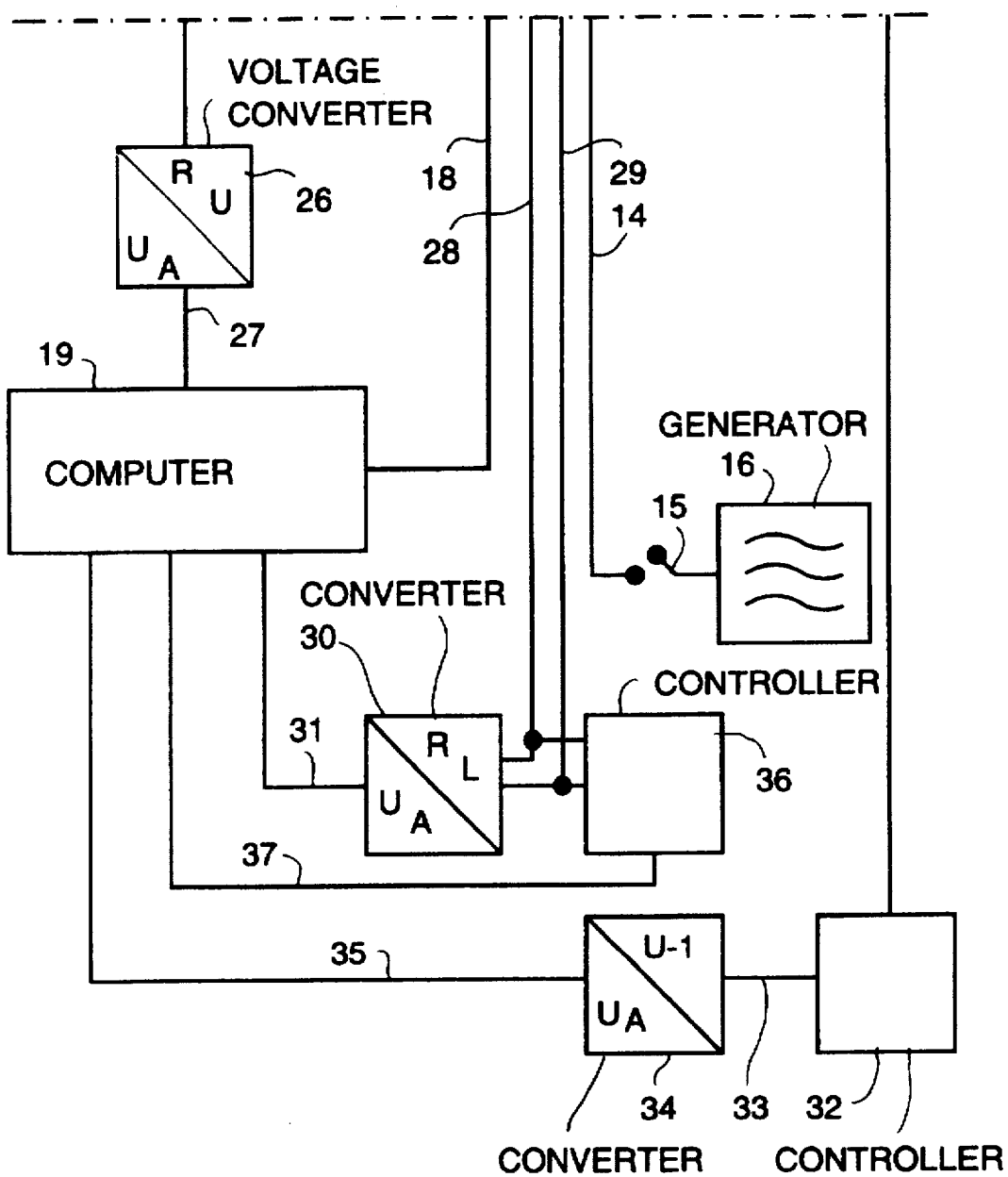
FIG. 2 a circuit diagram for the signals fed to the computer unit.

The gas-friction sensor is rotatably driven by means of four electrical drive coils, arranged in pairs (in FIG. 1, drive coils 13a–13d), and which via an electrical connecting line 14 and a switch 15 (FIG. 2) are connectable with a three-phase generator 16. The gas-friction sensor is arranged centrally between the four drive coils (13a–13d) in the metal tube 3. For detection of the speed of the gas-friction sensor 2, two sensing coils 17a and 17b serve as sensors (FIG. 1). An electrical voltage synchronous with the rotary speed is induced in these sensing coils by a rotation of the gas-friction sensor as a result of the magnetization components surrounding the gas-friction sensor at the rotation frequency thereof, which induced electrical voltage is delivered to a computer unit 19 by a signal line 18 (FIG. 2) connected to one of the sensor coils. The computer unit 19 determines the change with time of the rotation frequency of the rotatable body 2 from which the pressure prevailing in the vacuum chamber 4 of the gases surrounding the rotation body can be calculated. An angle sensor 22 on the measuring head 1, as a measuring device for the inclination to the vertical of the rotation axis 20. The rotation axis 20 here coincides with the symmetry axis 7 of the measuring head 1. The vertical 21 represented in FIG. 1 corresponds to the vertically oriented tube axis 6 (tube axis 6 and symmetry axis 7 are therefore additionally marked with reference characters 21 and 20, respectively). The angle sensor 22 embodiment is applied to the outer measuring head housing on a surface 23 of the measuring head 1 and adjusted, so that an inclination corresponding to the inclination angle 24 between the rotation axis 20 and the spatially-fixed vertical 21 is determined. The inclination angle 24 between the rotation axis 20 and the vertical 21 amounts in the embodiment to 90°.

The angle sensor 22 is connected via a signal line 25 with the input of a voltage converter 26 (FIG. 2) whose output is supplied to the computer 19 by a signal line 27. In the voltage converter 26, the signals produced by the angle sensor 22 (voltage value U or resistance value R) are transformed into a signal voltage $U_\alpha$ and switched into the computer unit 19.

One or more of the electrical coils for sensing the position of the gas friction sensor 2, for stabilizing it, for damping or for driving it are useable as a measuring device and signal emitter for the inclination angle 24 instead of the angle sensor 22. The alternating current resistance can be tapped from the drive coils 13a and 13b by signal lines 28, 29. The differential change in the tapped signal is converted in the voltage converter 30 to a signal voltage $U_\alpha$ proportional to the inclination angle 24. From voltage converter 30 a signal line 31 runs to the computer unit 19.

Further, in the embodiment, an electrical controller 32 is used as an indicator for the given inclination angle 24 of the angle-dependent determination and which serves for the orientation and centering of the rotation body 2. The electrical controller 32 has a control circuit which minimizes the power which is supplied via the control line 32' to the electrical stabilizing coils 10,11. The correction power, which is required to correct the position of the gas-friction sensor 2 within the metal tube 4, is proportional to the angle of inclination 24 between the rotation axis 20 and the vertical 21 and can be fed to a corresponding voltage converter 34 from controller 32 over a signal line 33. The voltage converter 34 transforms the electrical correction power into a corresponding signal voltage $U_\alpha$, which is delivered via the signal line 35 into the computer unit 19.

A further alternative for determining the angle of inclination 24 resides in maintaining, with the aid of the coil quartet 12 and 13, a centered position of the gas-friction sensor in the metal tube 3 which is independent from the inclination of the rotation axis 20 with respect to the vertical 21. The position of the gas-friction sensor 2 is then inductively picked up from the drive coils 13 and transmitted via the signal lines 28 and 29 connected thereto to the controller 36. The controller 36 and the voltage converter 30 are connectable alternatively with the signal lines 28 and 29 in the embodiment. From controller 36, the deviation of the gas-friction sensor 2 from its given setpoint position on the symmetry axis 7 between the coils 13 is determined and corresponding to the deviation, a control current is generated for repositioning the gas-friction sensor 2. The signal lines 28 and 29 serve as current conductors. A voltage proportional to the control current is transmitted from controller 36 over the signal line 37 to the computer unit 19 as an angle-proportional signal. In the three last described embodiments, the angle detection is possible without a change in the previously known measurement head construction.

We claim:

1. A gas-friction vacuum meter comprising:
means for forming an evacuatable measuring chamber connectable to a vacuum to be measured;
a gas-friction sensor rotatable in said chamber about a generally horizontal fixed rotation axis at an actual angle of inclination to a vertical;

means for producing a magnetic field symmetrical about said axis and contactlessly supporting said sensor whereby a change in rotation of said sensor represents a measurement of said vacuum;

means responsive to said change in rotation for producing a measured pressure value representing pressure of said vacuum;

means for determining, by eddy current braking of said gas-friction sensor, at least one eddy-current-conditioned braking value for a certain inclination angle of said rotation axis; and means for measuring said actual inclination angle and producing an output signal for correction of said measured pressure value by comparison of said output signal with said eddy-current-conditioned braking value.

2. The gas-friction vacuum meter defined in claim 1 wherein said means for measuring said actual inclination angle is at least one electric level.

3. The gas-friction vacuum meter defined in claim 1 wherein said means for measuring includes coils involved in magnetic field suspension of said gas friction sensor.

4. The gas-friction vacuum meter defined in claim 1 wherein said means for measuring includes electronic means responsive to a gravitational change on said gas friction sensor.

5. The gas-friction vacuum meter defined in claim 4 further comprising a means for magnetically correcting a gravitational change with a correction current forming a measured value of said actual inclination.

6. A method of operating a gas-friction vacuum meter wherein a gas friction sensor rotatable in an evacuatable measuring chamber has a generally horizontal fixed rotation axis at an actual angle of inclination to a vertical, said method comprising the steps of:

(a) contactlessly supporting said sensor by producing a magnetic field symmetrical about said axis and rotating said sensor so that, when said chamber is connected to a vacuum to be measured, a change in rotation of said sensor represents a measurement of said vacuum;

(b) obtaining at least one eddy-current conditioned braking value of said gas friction sensor for a certain inclination angle of said rotation axis;

(c) detecting said change in rotation and producing a measured pressure value representing pressure of said vacuum; and (d) measuring said actual inclination angle and producing an output signal for correction of said measured pressure value by comparison of said output signal with said eddy-current conditioned braking value.

\* \* \* \* \*